US012606107B2

(12) United States Patent
Li et al.

(10) Patent No.: US 12,606,107 B2
(45) Date of Patent: Apr. 21, 2026

(54) AUXILIARY BATTERY SYSTEM OF VEHICLE AND METHOD OF USING THE SAME

(71) Applicants: HYUNDAI MOTOR COMPANY, Seoul (KR); Kia Corporation, Seoul (KR)

(72) Inventors: Xiu Kun Li, Shandong (CN); Sung Il Kim, Jeonju-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 386 days.

(21) Appl. No.: 18/198,536

(22) Filed: May 17, 2023

(65) Prior Publication Data

US 2024/0140336 A1    May 2, 2024

(30) Foreign Application Priority Data

Oct. 26, 2022    (CN) .......................... 202211320021.2

(51) Int. Cl.
| | |
|---|---|
| *H02J 1/10* | (2026.01) |
| *B60R 16/033* | (2006.01) |
| *B60R 16/04* | (2006.01) |
| *H02J 7/00* | (2026.01) |

(52) U.S. Cl.
CPC ............ B60R 16/033 (2013.01); B60R 16/04 (2013.01); H02J 1/122 (2020.01); H02J 7/0048 (2020.01); H02J 7/0063 (2013.01); H02J 2310/40 (2020.01)

(58) Field of Classification Search
CPC ....... B60R 16/033; B60R 16/04; B60R 16/03; B60R 16/023; B60R 16/0307; H02J 1/122; H02J 7/0048; H02J 7/0063; H02J 2310/40; H02J 7/1423; H02J 2310/46; H02J 7/342; H02J 2207/20; H04L 12/40039; H04L 2012/40273; B60Y 2400/3084
See application file for complete search history.

(56) References Cited

U.S. PATENT DOCUMENTS

| | | | | |
|---|---|---|---|---|
| 2017/0279296 A1* | 9/2017 | Kwon | ...................... | B60R 16/03 |
| 2023/0373344 A1* | 11/2023 | Oh | ........................... | B60L 58/20 |
| 2023/0411986 A1* | 12/2023 | Suzuki | ................ | H02J 7/00712 |
| 2024/0380221 A1* | 11/2024 | Choi | ................... | H01M 10/425 |

* cited by examiner

*Primary Examiner* — Michael C Zarroli
(74) *Attorney, Agent, or Firm* — MORGAN, LEWIS & BOCKIUS LLP

(57)    ABSTRACT

An auxiliary battery system of a vehicle and a method of using the same include an auxiliary battery, a switching module, and an auxiliary battery control module, and the auxiliary battery stores power used in a plurality of loads of the vehicle, and configured to provide the power to a first load and a second load among the plurality of loads in a state in which the vehicle is parked, the switching module is electrically connected between the auxiliary battery and the first load, and the auxiliary battery control module is configured to determine whether a vehicle communication network enters a sleep mode in the state where a vehicle is parked, turn on a switching module when it is determined that the vehicle communication network has not entered the sleep mode, and turn off the switching module when a predetermined time period has elapsed after it is determined that the vehicle communication network has entered the sleep mode.

20 Claims, 10 Drawing Sheets

AUXILIARY BATTERY SYSTEM OF VEHICLE AND METHOD OF USING THE SAME

CROSS-REFERENCE TO RELATED APPLICATION

The present application claims priority to Chinese Patent Application No. 202211320021.2 filed in the Chinese National Intellectual Property Administration on Oct. 26, 2022, the entire contents of which is incorporated herein for all purposes by this reference.

BACKGROUND OF THE PRESENT DISCLOSURE

Field of the Present Disclosure

The present disclosure relates to a vehicle battery technology field, and in particular, to an auxiliary battery system of a vehicle and a method of using the same.

Description of Related Art

The Idle stop and go (ISG) system applied to vehicles is the system which automatically keeps the engine idle when the vehicle is stopped (for example, waiting for a signal), automatically stops the engine when certain conditions are met, and then restarts the engine when the vehicle starts to reduce fuel consumption. In vehicles provided with the ISG system, a starting battery system for the vehicle lowers the voltage of the starting battery to a predetermined level due to a sudden drop in voltage due to restarting, and this causes the load placed on the vehicle to be reset, causing instability of power supply. To solve the above problem, the electric vehicles in the related art are provided with an independent low-voltage DC-to-DC converter (LDC) unit of stabilizing the voltage provided by the starting battery to the load (for example, audio device/navigation device/cluster, and the like) when the ISG is restarted. However, because the LDC unit is heavy and bulky, there are problems in increasing the weight of the electric vehicle or reducing the use rate of the internal space, and also problems in that it is difficult to pack the LDC unit and assembly cost is high.

To sum up, a general starting battery system lacks in providing a stable power supply to many loads placed in a vehicle. Therefore, it is urgent to introduce a vehicle battery system that can effectively solve the above-mentioned problems.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an auxiliary battery system for a vehicle and a method of using the same. The auxiliary battery system of the vehicle stores power used for a load of the vehicle by use of an auxiliary battery, so that it is possible to provide stable power to the load of the vehicle. In a vehicle with an ISG system in which a restart is required, the auxiliary battery system of the vehicle enhances the safety of the vehicle by ensuring the stability of the load power supply.

Various aspects of the present disclosure are directed to providing an auxiliary battery system of a vehicle. The auxiliary battery system may include: an auxiliary battery configured to store power used in a plurality of loads of the vehicle, and configured to provide the power to a first load and a second load among the plurality of loads or to provide the power to the second load in a state in which the vehicle is parked; a switching module electrically connected between the auxiliary battery and the first load; and an auxiliary battery control module configured to determine whether a vehicle communication network enters a sleep mode in the state where the vehicle is parked, turn on the switching module to provide the power of the auxiliary battery to the first load when the auxiliary battery control module concludes that the vehicle communication network has not entered the sleep mode, and turn off the switching module when a predetermined time period has elapsed after the auxiliary battery control module concludes that the vehicle communication network has entered the sleep mode.

The auxiliary battery control module is further configured to control the auxiliary battery in an idle stop and go state of the vehicle to provide the power of the auxiliary battery to the first load among the plurality of loads.

The switching module includes a current sensor, the current sensor is configured to detect a current flowing into the first load in the state where the vehicle is parked, and when the detected current flowing into the first load is equal to or greater than a threshold, failure information of the current of the first load is transmitted from the current sensor to the auxiliary battery control module.

The auxiliary battery control module is configured to: monitor a state of charge (SOC) value of the auxiliary battery in a state where the vehicle is in the idle stop and go state, control the auxiliary battery to provide the power to the first load among the plurality of loads when the SOC value of the auxiliary battery is equal to or greater than a predetermined value, and stop working of the auxiliary battery when the SOC value of the auxiliary battery is less than the predetermined value.

The power is supplied to the first load and the second load by use of a power generated by a generator of the vehicle while the vehicle is in a driving state.

The power is supplied to the first load and the second load by use of power stored in a starting battery of the vehicle while the vehicle is in a standby state.

The auxiliary battery system further includes a voltage converter, in which the voltage converter is electrically connected between the generator or the starting battery of the vehicle and the switching module of the auxiliary battery system and is configured to stabilize a voltage of the power input to the first load.

The first load includes at least one of an audio device, a cluster, a navigation device, and an audio amplifier, and the second load includes at least one of a vehicle odometer, an air conditioner controller, a mood light controller, a cigarette jack, a wireless charging device, and a power output device.

The auxiliary battery control module is configured to monitor battery state information of the auxiliary battery and send the monitored battery state information to an AVNT system of the vehicle through the vehicle communication network in real time.

The AVNT system is configured to transmit the received battery state information to a user terminal wirelessly.

Various aspects of the present disclosure are directed to providing a method of using an auxiliary battery system of a vehicle. The auxiliary battery system of the vehicle includes an auxiliary battery, a switching module, and an auxiliary battery control module, and being configured to control supply of power to a first load and a second load among a plurality of loads. The switching module is electrically connected between the auxiliary battery and the first load.

The method includes: storing the power used for a plurality of loads of the vehicle by the auxiliary battery; providing the power to the first load and the second load among the plurality of loads in a state in which the vehicle is parked; in the state in which the vehicle is parked, determining whether a vehicle communication network enters a sleep mode by the auxiliary battery control module; turning on the switching module by the auxiliary battery control module when it is determined that the vehicle communication network has not entered the sleep mode; and turning off the switching module by the auxiliary battery control module when a predetermined time period elapses after it is determined that the vehicle communication network has entered the sleep mode.

In an idle stop and go state of the vehicle, the auxiliary battery control module is configured to control the auxiliary battery to provide the power to the first load among the plurality of loads.

The switching module includes a current sensor, and the method may further include detecting, by the current sensor, a current flowing into the first load in the state in which the vehicle is parked; and when the detected current flowing into the first load is equal to or greater than a threshold, transmitting, by the current sensor, failure information of the current of the first load to the auxiliary battery control module.

The method further includes monitoring a state of charge (SOC) value of the auxiliary battery by the auxiliary battery control module while the vehicle is in the idle stop and go state; when the SOC value of the auxiliary battery is equal to or greater than a predetermined value, controlling, by the auxiliary battery control module, the auxiliary battery to provide the power to the first load among the plurality of loads; and when the SOC value of the auxiliary battery is less than the predetermined value, controlling, by the auxiliary battery control module, the auxiliary battery to stop working.

The power is supplied to the first load and the second load by use of a power generated by a generator of the vehicle while the vehicle is in a driving state.

The power is supplied to the first load and the second load by use of power stored in a starting battery of the vehicle while the vehicle is in a standby state.

The auxiliary battery system of the vehicle further includes a voltage converter, and the voltage converter is electrically connected between the generator or the starting battery of the vehicle and the switching module of the auxiliary battery system and is configured to stabilize a voltage of the power input to the first load.

The first load includes at least one of an audio device, a cluster, a navigation device, and an audio amplifier, and the second load includes at least one of a vehicle odometer, an air conditioner controller, a mood light controller, a cigar jack, a wireless charging device, and a power output device.

The auxiliary battery control module is configured to monitor battery state information of the auxiliary battery and sends the monitored battery state information to an AVNT system of the vehicle through the vehicle communication network in real time.

The AVNT system is configured to transmit the received battery state information to a user terminal wirelessly.

The present disclosure utilizes the above technical solution and has the following advantageous effects.

The cost and weight may be reduced by eliminating the LDC unit of ensuring the stability of power supply in the general battery system. By installing the auxiliary battery system to match the rated capacity of a load, such as an audio device or a navigation device, it is possible to stably provide power to a plurality of loads disposed in the vehicle. In a vehicle with an ISG system requiring restart, the safety of the vehicle is enhanced by ensuring the stability of the power supply to the load.

The auxiliary battery control module provided in the auxiliary battery system of the vehicle is configured to perform blocking control on the parasitic current of the first load after parking for the predetermined time period, preventing the auxiliary battery from continuously running out of power, and forcibly cutting off the power supply of the auxiliary battery.

The auxiliary battery control module may monitor the SOC value of the auxiliary battery, and when the auxiliary battery is at the low SOC, the auxiliary battery control module may stop the operation of the auxiliary battery by use of the protection function. In the instant case, by performing the same power flow and charging/discharging logic as in the standby state of the vehicle, the power of the first load including an effect on safety may be increased, and safety problems due to the lack of power of the first load may be prevented.

The auxiliary battery system may communicate with the user terminal, and the auxiliary battery control module may transmit the monitored auxiliary battery state to the user terminal. Accordingly, the user is capable of monitoring the state of the auxiliary battery in the user terminal and selecting whether to charge or discharge the auxiliary battery. Furthermore, when there is no need to use the odometer, the function of the odometer may be turned off according to the user's will.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a schematic diagram of a vehicle battery system according to various exemplary embodiments of the present disclosure.

Figure 1:
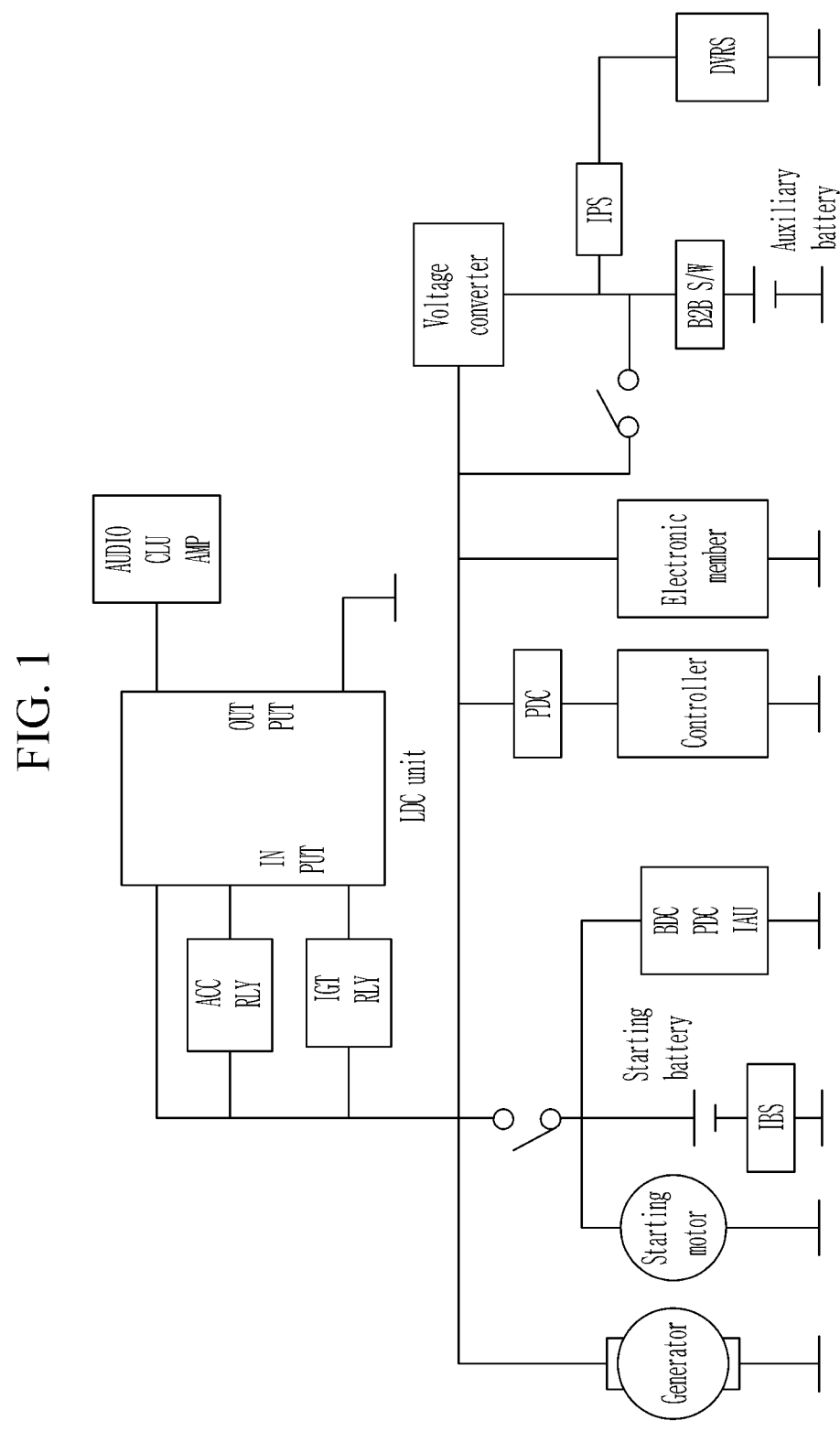
FIG. 1 is a schematic diagram illustrating a battery system of a typical vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail. The present implementation method is implemented on the premise of the technical solution of the present disclosure, and detailed implementation methods and specific operation procedures are presented, but the scope of the present disclosure is not limited to the following implementation methods.

FIG. 1 is a schematic diagram illustrating a battery system of a typical vehicle. As illustrated in FIG. 1, according to the application of technologies, such as remote upgrade (On the Air, OTA) of a vehicle's controller and an odometer (or Driving Video Recording System (DVRS)), an internal combustion engine (ICE) vehicles use a dual battery system (that is, a 12V starting battery and a 12V auxiliary battery).

To ensure the safety of power supply, when only the controller OTA is present, a 20 Ah 12V auxiliary lithium battery may be used, and when the controller OTA and the odometer are present together, a 30 Ah 12V auxiliary lithium battery with a larger battery capacity needs to be used.

Recently, as fuel efficiency becomes important, a system for improving fuel efficiency is being applied to a vehicle. An Idle stop and go (ISG) function is widely used to improve fuel efficiency and has recently been provided in most vehicles.

In a process of restarting the ISG, a load of the 12V starting battery mounted in the vehicle has a large change within a short time, which may be a process of switching from no load to full load. During the present instantaneous process, the voltage of the 12V starting battery may drop below 6V, so some devices receiving power from the 12V starting battery may not be able to operate normally. For example, a sound or the like may stop working. Therefore, to secure the stability of the power supply, some devices receiving power from the 12V starting battery are ensured to be normally powered even if the voltage of the 12V starting battery drops during the ISG restart process by adding a low-voltage DC-to-DC converter (LDC) unit to a typical vehicle battery system, causing no inconvenience to users.

As illustrated in FIG. 1, each of a generator and a starting battery is electrically connected to an input terminal (IN-PUT) of an LDC unit. Furthermore, an ACC relay (RLY) corresponding to power-on of vehicle components and an IG1 relay corresponding to power-on of the entire vehicle are further provided at the input terminal of the LDC unit. An output terminal (OUTPUT) of the LDC unit is electrically connected to an audio (AUDIO) device, a cluster (CLU), an audio amplifier (AMP) or a navigation device.

For example, the audio device may use the LDC unit including an output of 200 W, and the navigation device may use the LDC unit including an output of 450 W.

Thus, according to the typical vehicle battery system, the power generated by the vehicle's generator is transmitted to the audio (AUDIO) device, the cluster (CLU), the audio amplifier (AMP) or the navigation device through the LDC unit while the vehicle is in a driving state. During the ISG restart process, the power from the starting battery is used to supplement the power generated by the generator to supply power to the audio (AUDIO) device, the cluster (CLU), the audio amplifier (AMP) or the navigation device.

However, because the LDC unit is heavy and bulky, a problem of increasing a weight of the electric vehicle or reducing a use rate of the internal space may occur. Furthermore, there are problems in that it is difficult to pack the LDC unit and assembly cost of the LDC unit is high. To sum up, a general starting battery system is insufficient in supplying stable power to many loads provided in the vehicle.

Figure 2:
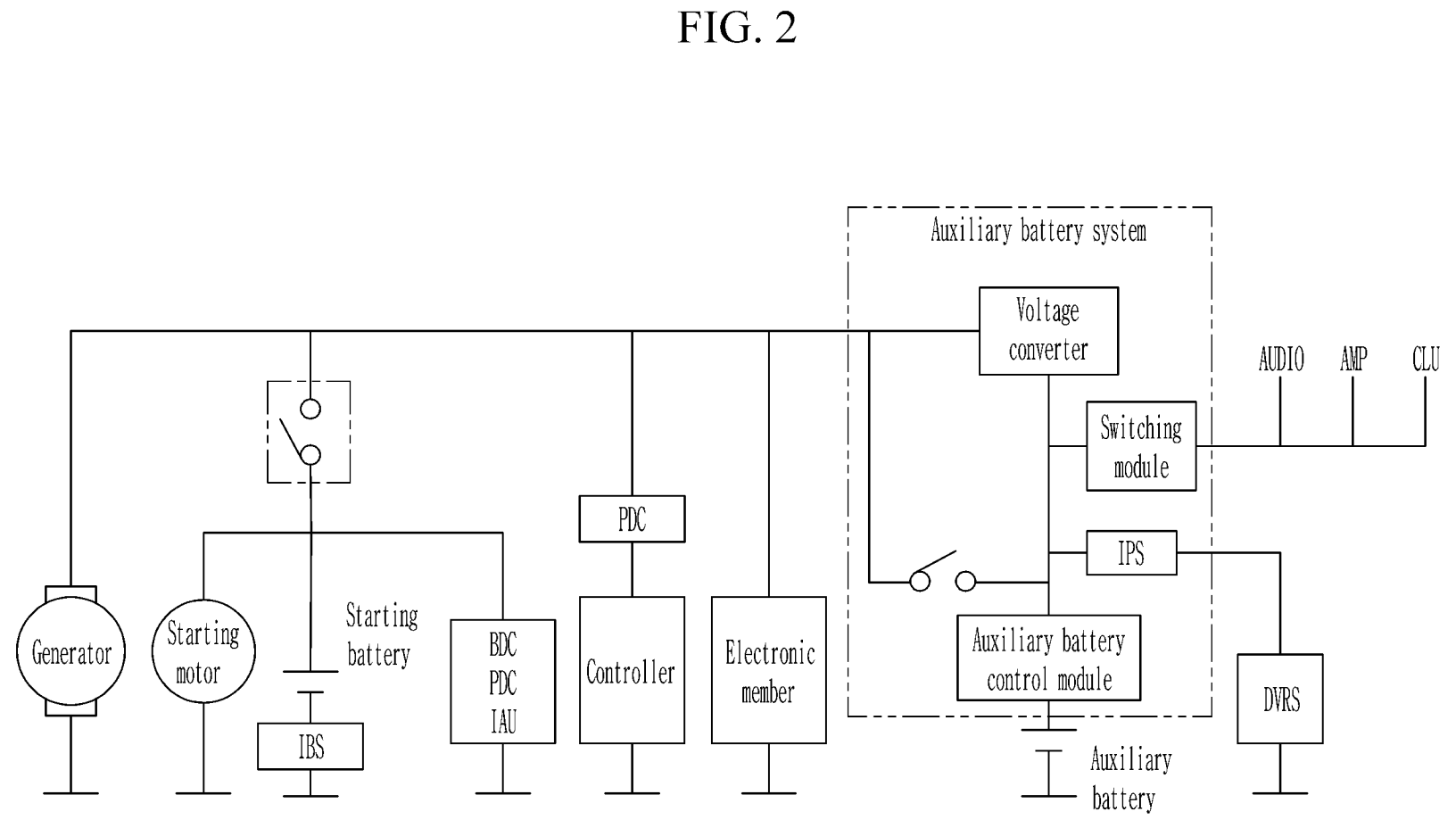

FIG. 2 is a schematic diagram illustrating a battery system for a vehicle according to various exemplary embodiments of the present disclosure. In the vehicle battery system according to the exemplary embodiment of the present disclosure illustrated in FIG. 2, the LDC unit of FIG. 1 is removed and the auxiliary battery system is modified. Because the auxiliary battery used in the auxiliary battery system may be a lithium battery and may supply power in a parking state, the auxiliary battery system may be referred to as a Parking Lithium Battery Module (P-LBM).

According to the exemplary embodiment of the present disclosure, the auxiliary battery included in the auxiliary battery system may store power used for a plurality of loads of the vehicle. The plurality of loads may include a first load and a second load. The first load may include at least one of electrical devices, such as an audio device, a cluster, a navigation device, and an audio amplifier, whose normal operations may still be ensured in a starting or stopped state of the vehicle. The second load may include a vehicle odometer, a controller of the vehicle, and some electronic members. For example, the controller of the vehicle may include an air conditioner controller, a mood light controller, and the like, and some electronic members may include a cigar jack, a wireless charging device, a power output device, and the like.

Hereinafter, power supply to the first load and the second load in different states of the vehicle will be described in detail with reference to FIG. 3A, FIG. 3B, FIG. 3C, and FIG. 3D.

Figure 3A:
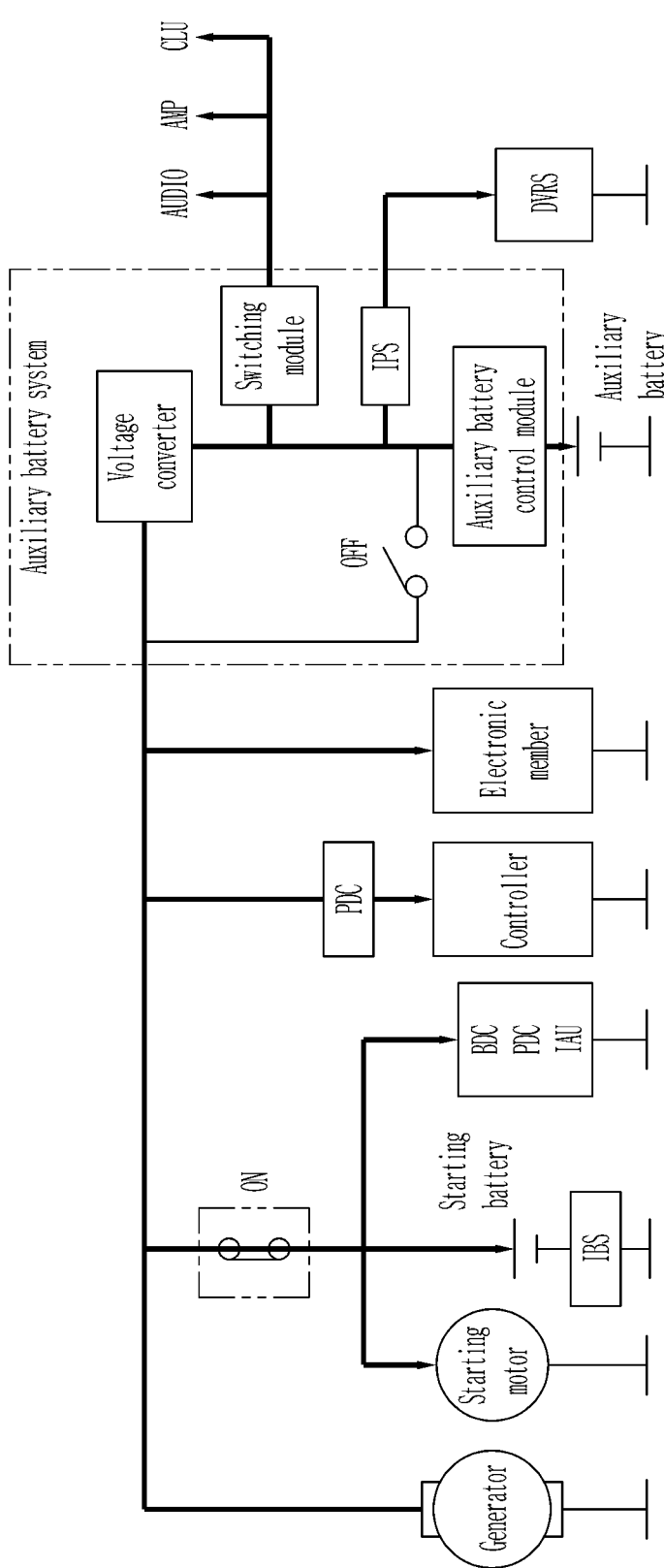
FIG. 3A is a schematic diagram illustrating power supply to a first load and a second load in a driving state of a vehicle.

FIG. 3A is a schematic diagram illustrating power supply to a first load and a second load in a driving state of a vehicle. The driving state refers to a state in which the engine of the vehicle is operating. As illustrated in FIG. 3A, the generator generates energy for driving the vehicle when receiving power output from the starting battery, generates power during a driving period of the vehicle, and then outputs the generated power to the starting battery and the auxiliary battery.

Furthermore, the power generated by the generator is also output to the plurality of loads of the vehicle. The power generated by the generator is output to the electronic load provided in the vehicle, such as a body domain controller (BDC), a power domain controller (PDC), and an identity authentication unit (IAU), to provide the load with the power.

The power generated by the generator is output to the controller of the vehicle through the power domain controller (PDC). The power generated by the generator is also output to some electronic members. The power generated by the generator is output to the driving video recording system (DVRS) through the integrated power switch (IPS). The power generated by the generator is output to the audio (AUDIO) device, the audio amplifier (AMP), and the cluster (CLU).

Accordingly, according to the exemplary embodiment of the present disclosure, power may be supplied to the first load and the second load by use of the power generated by the generator of the vehicle during the traveling period of the vehicle. The first load may include the audio device, the cluster, the navigation device, the audio amplifier, and the like, and the second load may include the vehicle odometer, the air conditioner controller, the mood light controller, the cigar jack, the wireless charging device, the power output device, and the like.

When the power supply of the generator is insufficient due to the operating state of the vehicle (for example, the vehicle is on an uphill road), the starting battery may use the power stored in the starting battery to supply power to the plurality of loads of the vehicle.

Figure 3B:
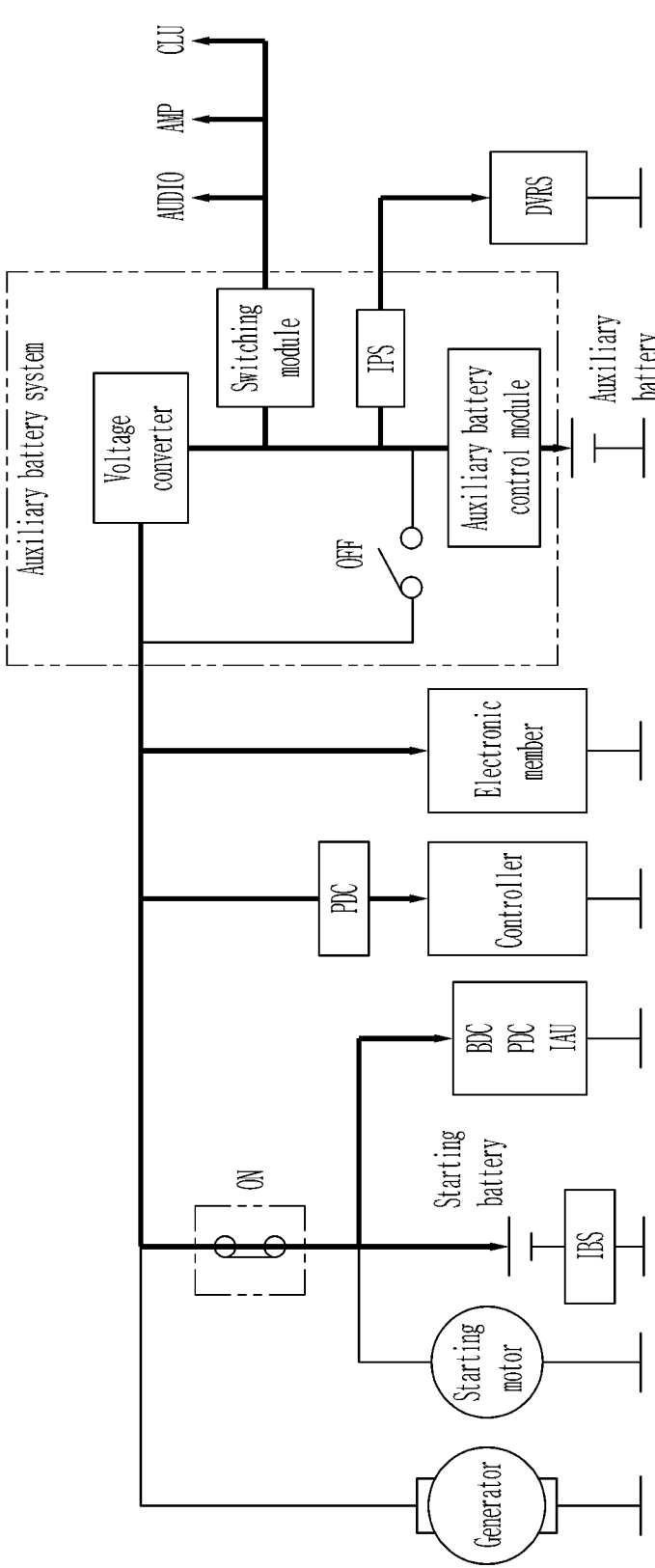
FIG. 3B is a schematic diagram illustrating power supply to a first load and a second load in a standby state of a vehicle.

FIG. 3B is a schematic diagram illustrating power supply to the first load and the second load in a standby state of the vehicle. The standby state refers to a state in which the engine is not running, an occupant is in the vehicle, and the vehicle's network communication is in an active mode. As illustrated in FIG. 3B, the starting battery is in a discharged state and outputs the power stored in the starting battery to the plurality of loads of the vehicle. The power stored in the starting battery is output to the BDC, the PDC, and the IAU. The power stored in the starting battery is output to the controller of the vehicle through the power domain controller (PDC). The power stored in the starting battery is output to some electronic members. The power stored in the starting battery is output to the DVRS (or the odometer) through the IPS. The power stored in the starting battery is output to the audio (AUDIO) device, the audio amplifier (AMP), and the cluster (CLU). Therefore, according to the exemplary embodiment of the present disclosure, the power is supplied to the first load and the second load by use of the power stored in the vehicle's starting battery while the vehicle is in the standby state.

Figure 3C:
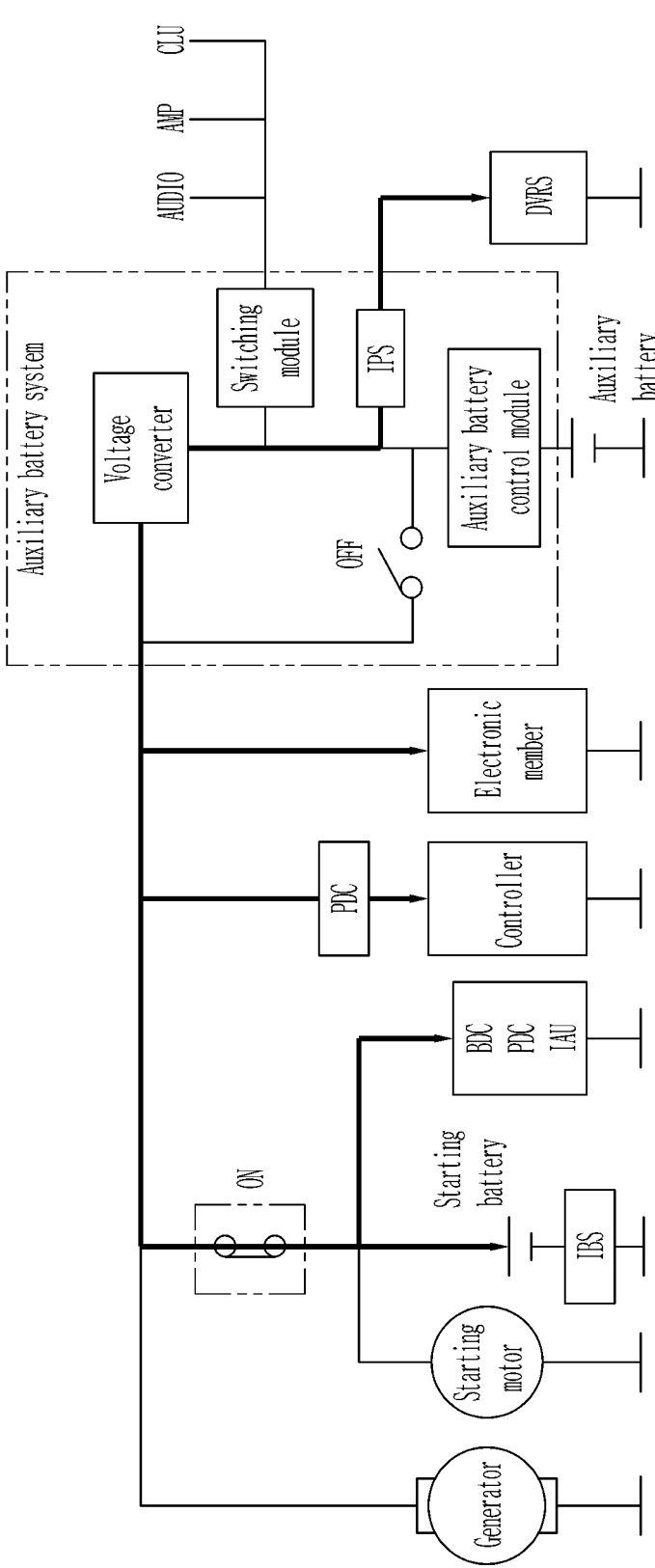
FIG. 3C is a schematic diagram illustrating power supply to a first load and a second load in an idle stop and go state of a vehicle.

FIG. 3C is a schematic diagram illustrating power supply to the first load and the second load in an idle stop and go state of the vehicle. As illustrated in FIG. 3C, when the vehicle is stopped and the engine is automatically maintained in an idle state or a stopped state, the starting battery and the auxiliary battery are in the discharged state. The power stored in the starting battery is output to the BDC, the PDC, and the IAU, output to the controller of the vehicle through the power domain controller (PDC), output to some electronic members, and output to the DVRS (or the odometer) through the IPS. The power stored in the auxiliary battery is output to the audio (AUDIO) device, the audio amplifier (AMP), and the cluster (CLU). Therefore, according to the exemplary embodiment of the present disclosure, in the idle stop and go state of the vehicle, the auxiliary battery provides the power to the first load among the plurality of loads, and the starting battery provides the power to the second load among the plurality of loads.

In the instant case, when the ISG function is turned on, the power is also supplied to the audio device, the navigation device, and the like by the auxiliary battery, solving the problem in that the power supply is unstable when the ISG is restarted. For example, the audio device in the vehicle does not have a problem in that volume becomes low due to a change in voltage.

Figure 3D:
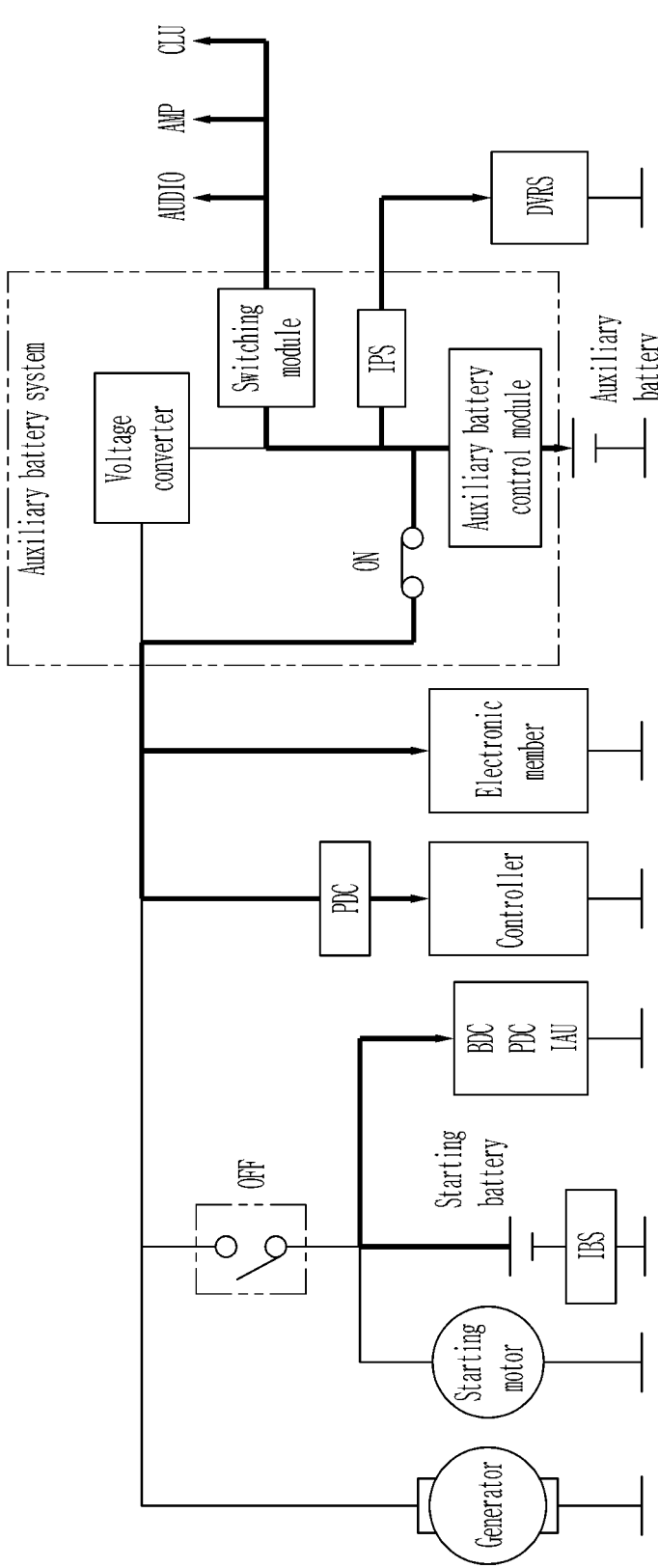
FIG. 3D is a schematic diagram illustrating power supply to a first load and a second load in a parking state of a vehicle.

FIG. 3D is a schematic diagram illustrating power supply to the first load and the second load in a parking state of the vehicle. The parking state refers to a state in which the engine is not running, the occupant has already disembarked, and the vehicle's network communication is in a sleep mode. As illustrated in FIG. 3D, the power stored in the starting battery is output to the BDC, the PDC, and the IAU, and the auxiliary battery is in the discharged state. The power stored in the auxiliary battery is output to the controller of the vehicle through the power domain controller (PDC). The power stored in the auxiliary battery is output to some electronic members. The power stored in the starting battery is output to the DVRS (or the odometer) through the IPS. The power stored in the auxiliary battery is output to the audio (AUDIO) device, the audio amplifier (AMP), and the cluster (CLU). Accordingly, according to the exemplary embodiment of the present disclosure, in the state in which the vehicle is parked, the auxiliary battery supplies power to the first load and the second load among the plurality of loads.

Figure 4:
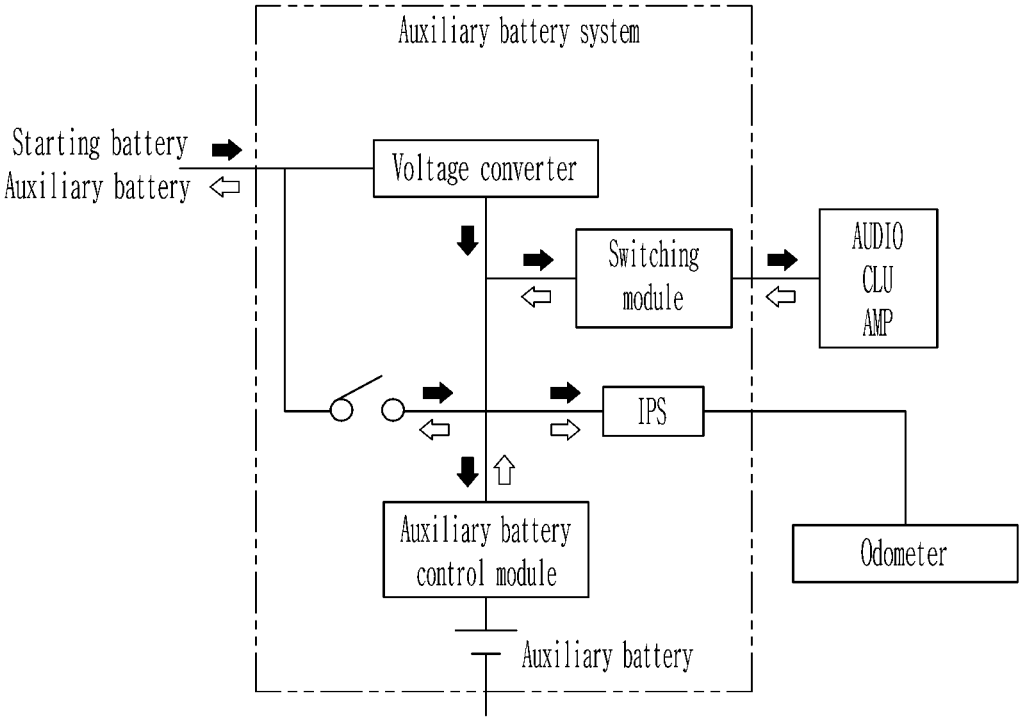
FIG. 4 is a schematic diagram illustrating an auxiliary battery system for a vehicle according to various exemplary embodiments of the present disclosure.

FIG. 4 is a schematic diagram illustrating an auxiliary battery system for the vehicle according to various exemplary embodiments of the present disclosure.

Hereinafter, an auxiliary battery system of the vehicle will be described in detail with reference to FIG. 4.

As illustrated in FIG. 4, the auxiliary battery system of the vehicle according to the exemplary embodiment of the present disclosure includes a voltage converter, a switching module, an integrated power switch (IPS), an auxiliary battery control module, and an auxiliary battery. The auxiliary battery control module may be implemented through software.

Referring to FIG. 3A, FIG. 3B and FIG. 3C, the voltage converter is electrically connected between the generator or the starting battery of the vehicle and the switching module of the auxiliary battery system, and is also configured to stabilize the output voltage.

The integrated power switch (IPS) is electrically connected to the odometer to control the turn-on and turn-off of the odometer.

One end portion of the switching module is electrically connected to the first load, and the other end portion of the switching module is electrically connected between the voltage converter and the auxiliary battery control module. When the switching module is turned on, the power is supplied to the first load using the power converted by the voltage converter or the power of the auxiliary battery, and when the switching module is turned off, the power cannot be supplied to the first load. In the state in which the vehicle is parked or in the ISG state, the power is provided to the first load by use of the power of the auxiliary battery, and in the state in which the vehicle is running or in the standby state, the power is provided to the first load by use of the power converted by the voltage converter.

In the state in which the vehicle is parked, the auxiliary battery control module may be configured to determine whether the vehicle communication network enters the sleep mode. When it is determined that the vehicle communication network has not entered the sleep mode, the switching module is turned on to ensure vehicle use requirements, such as state monitoring and remote control functions, within a certain time after the vehicle is parked. When a predetermined time period elapses after it is determined that the vehicle communication network has entered the sleep mode, the switching module is turned off.

The vehicle communication network may be a Controller Area Network (CAN) communication of the vehicle, but the present disclosure is not limited thereto.

When the vehicle is in the parked state and the network communication of the vehicle does not enter the sleep mode, the auxiliary battery control module turns on the switching module and provides the power to the first load by use of the auxiliary battery. After the vehicle is in the parking state and the network communication of the vehicle enters the sleep mode, when the switching module is still in the turned-on state within the predetermined time period, the first load consumes only a small amount of current.

After the communication network of the vehicle enters the sleep mode and the predetermined time period elapses (for example, after 7 days), the auxiliary battery control module turns off the switching module and blocks the parasitic current in the first load, preventing the auxiliary battery from constantly running out of the power and forcibly cutting off the power supply of the auxiliary battery.

According to the exemplary embodiment of the present disclosure, in the idle stop and go state of the vehicle, the auxiliary battery control module may supply the power to the first load among the plurality of loads by use of the auxiliary battery. The auxiliary battery control module may monitor a state of charge (SOC) value of the auxiliary battery while the vehicle is in the idle stop and go state. When the SOC value of the auxiliary battery is equal to or greater than a set value, the auxiliary battery control module causes the auxiliary battery to provide the power to the first load among the plurality of loads. When the SOC value of the auxiliary battery is less than the set value, the auxiliary battery control module causes the auxiliary battery to stop working.

As an exemplary embodiment of the present disclosure, the set value for the SOC value of the auxiliary battery may be set to 30%. For example, in the ISG state of the vehicle, when the SOC value of the auxiliary battery drops to 29%, the auxiliary battery stops working. In the instant case, the power of the first load and the second load is provided from the starting battery. That is, in the ISG state of the vehicle, when the SOC value of the auxiliary battery is less than the set value, the same power flow and charge and discharge logic as the standby state of the vehicle is performed. Accordingly, when the SOC value of the auxiliary battery is low, the auxiliary battery system may apply a protection function to increase the power of the first load affecting safety, and safety problems due to the lack of power of the first load may be prevented.

Figure 5:
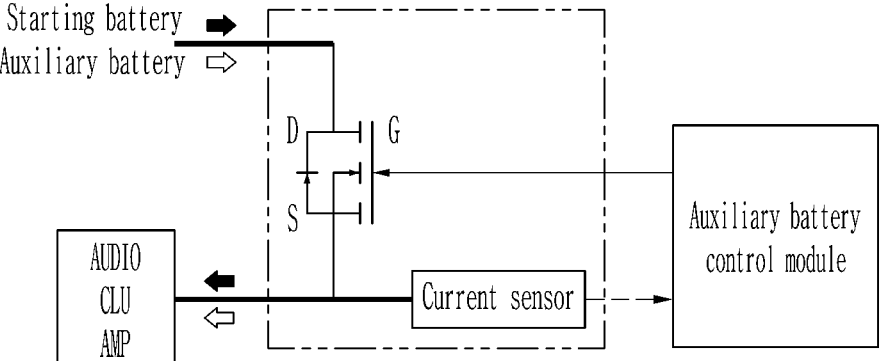
FIG. 5 is a schematic diagram illustrating a structure between a switching module, a first load, and an auxiliary battery control module according to various exemplary embodiments of the present disclosure.

FIG. 5 is a schematic diagram illustrating a structure between the switching module, the first load, and the auxiliary battery control module according to the exemplary embodiment of the present disclosure. As illustrated in FIG. 5, the switching module may be a depletion type N-channel metal-oxide-semiconductor field-effect transistor (MOSFET), and also include a gate G, a source S, and a drain D. A body diode (which may also be referred to as a parasitic diode) is provided between the source S and the drain D.

The gate G of the switching module is electrically connected to the auxiliary battery control module, the drain D is electrically connected to the starting battery or the auxiliary battery by the voltage converter, and the source S is electrically connected to the first load. The direction of the parasitic diode is a direction from the first load to the starting battery or the auxiliary battery. Generally, when a positive voltage is applied to the gate, it conducts the MOSFET.

According to the exemplary embodiment of the present disclosure, when it is determined by the auxiliary battery control module that the vehicle communication network does not enter the sleep mode, the corresponding control voltage is applied to the gate to conduct the MOSFET, providing the power to the first load by use of the auxiliary battery. In another case, when it is determined by the auxiliary battery control module that the communication network of the vehicle enters the sleep mode and it is determined by an on-board timer that the predetermined time period has elapsed after the communication network of the vehicle enters the sleep mode, the corresponding control voltage is applied to the gate to turn off the MOSFET, blocking the auxiliary battery from providing the power to the first load.

According to the exemplary embodiment of the present disclosure, when it is determined by the auxiliary battery control module that the SOC value of the auxiliary battery is equal to or greater than the set value, the corresponding control voltage is applied to the gate to conduct the MOSFET, providing the power to the first load by use of the auxiliary battery. When it is determined by the auxiliary battery control module that the SOC value of the auxiliary battery is less than the set value, the power cannot be provided to the first load.

Also, as illustrated in FIG. 5, the switching module may further include a current sensor, and the current sensor may detect a current flowing into the first load while the vehicle is in the parked state. When the detected current flowing into the first load is equal to or greater than a threshold, failure information of the current of the first load is transmitted to the auxiliary battery control module.

According to the exemplary embodiment of the present disclosure, the auxiliary battery control module may perform the blocking control on the parasitic current of the first load after the vehicle is parked for the predetermined time period, and may monitor the SOC value of the auxiliary battery. Therefore, according to the monitoring result, the auxiliary battery may be properly charged or discharged. For example, the generator may charge the auxiliary battery including the SOC smaller than the predetermined value while the vehicle is driving. In contrast, when the SOC value of the auxiliary battery is low in the parking or the idle stop and go state of the vehicle, the auxiliary battery may stop operating and supply the necessary power to the first load as needed.

Also, the auxiliary battery control module may monitor auxiliary battery state information including a state of health (SOH) of the auxiliary battery. The auxiliary battery control module may perform the charge and discharge control for the auxiliary battery according to the charge and discharge current which is maximally allowable at the battery temperature. The auxiliary battery control module may protect the current or the voltage of the auxiliary battery.

Figure 6:
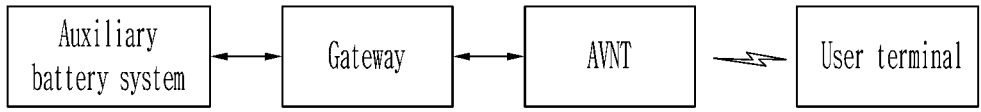
FIG. 6 is a block diagram of a configuration to which the auxiliary battery system according to various exemplary embodiments of the present disclosure is applied.

FIG. 6 is a block diagram of a configuration to which the auxiliary battery system according to the exemplary embodiment of the present disclosure is applied. As illustrated in FIG. 6, the auxiliary battery control module monitors the battery state information of the auxiliary battery, and the monitored battery state information is transmitted to an audio, video, navigation, and telematics (Audio Video Navigation Telematics, AVNT) system of the vehicle through an in-vehicle gateway. The in-vehicle gateway may be the vehicle communication network. In the instant case, the battery state information may be displayed on the display of the AVNT system.

Furthermore, the AVNT system may transmit the received battery state information to the user terminal wirelessly. The user terminal may be a mobile phone of the user. The AVNT system allows the user to check the SOC value of the auxiliary battery on the mobile phone in real time and to stop the discharging of the auxiliary battery when the SOC is low. Alternatively, the user may have the vehicle's load to start charging through the mobile phone.

When the vehicle has been parked in the parking lot for a long time and there is no need to use the odometer function, the controller of the vehicle sends the switch information of the odometer to the mobile phone, and the user may turn off the odometer on the mobile phone.

The user may realize the charging and discharging the auxiliary battery and the turning on or off the odometer through button installation, but the present disclosure is not limited thereto.

According to various exemplary embodiments of the present disclosure, various functions related to power management may be separately realized by use of a wireless communication method.

A method of using the auxiliary battery system of the vehicle according to various exemplary embodiments of the present disclosure includes storing the power used for the plurality of loads of the vehicle by the auxiliary battery, and providing the power to the first load and the second load among the plurality of loads in the state where the vehicle is parked. The switching module is electrically connected between the auxiliary battery and the first load.

The first load may include at least one of the audio device, the cluster, the navigation device, the audio amplifier, and the like, and the second load may include at least one of the vehicle odometer, the air conditioner controller, the mood light controller, the cigar jack, the wireless charging device, the power output device, and the like.

Figure 7:
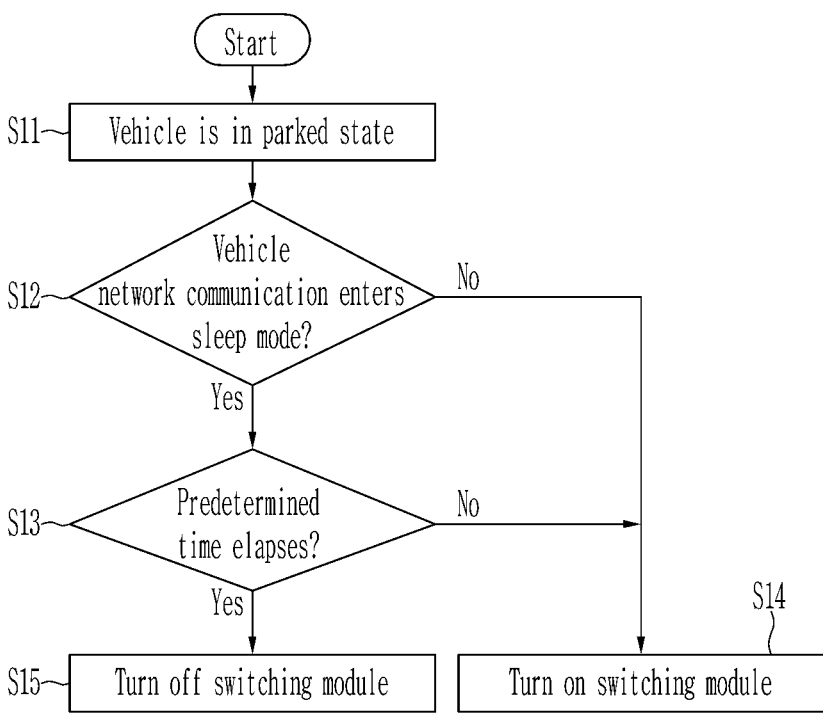
FIG. 7 is a flowchart illustrating an operation of an auxiliary battery control module according to various exemplary embodiments of the present disclosure.

FIG. 7 is a flowchart illustrating an operation of the auxiliary battery control module according to the exemplary embodiment of the present disclosure. As illustrated in FIG. 7, in a state in which the vehicle is parked at step S11, it is determined whether the vehicle communication network enters the sleep mode by the auxiliary battery control module at step S12, when it is determined that the vehicle communication network has not entered the sleep mode ("NO" at the step S12), the switching module is turned on at step S14; and after it is determined that the vehicle communication network has entered the sleep mode ("YES" at the step S12) and a predetermined time period elapses ("YES" at step S13), the switching module is turned off.

In the exemplary embodiment of the present disclosure, the switching module includes the current sensor, and detects the current flowing into the first load by the current sensor in the state where the vehicle is parked. When the detected current flowing into the first load is equal to or greater than the threshold, the failure information of the current of the first load is transmitted to the auxiliary battery control module by the current sensor.

In the idle stop and go state of the vehicle, the auxiliary battery control module causes the auxiliary battery to provide the power to the first load among the plurality of loads. During the idle stop and go of the vehicle, the auxiliary battery control module monitors the SOC value of the auxiliary battery. When the SOC value of the auxiliary battery is equal to or greater than the set value, the auxiliary battery provides the power to the first load among the plurality of loads. When the SOC value of the auxiliary battery is less than the set value, the auxiliary battery stops working.

The power is supplied to the first load and the second load by use of the power generated by the generator of the vehicle while the vehicle is in the driving state.

The power is supplied to the first load and the second load by use of the power stored in the vehicle's starting battery while the vehicle is in the standby state.

The auxiliary battery system of the vehicle further includes the voltage converter, and the voltage converter is electrically connected between the generator or the starting battery of the vehicle and the switching module of the auxiliary battery system and also configured to stabilize the voltage of the power input to the first load.

The battery state information of the auxiliary battery is monitored by the auxiliary battery control module, and the monitored battery state information is transmitted in real time to the AVNT system of the vehicle through the vehicle communication network.

Effects of the auxiliary battery system for the vehicle and the method using the same according to an exemplary embodiment of the present disclosure are as follows.

Because the LDC unit of securing the safety of power supply in the general battery system is heavy and bulky, there is a problem of increasing the weight of the electric vehicle or reducing the use rate of the internal space. Furthermore, the LDC unit also has problems such as difficult packaging and high assembly cost. Therefore, according to the exemplary embodiment of the present disclosure, the cost and weight are reduced by removing the LDC unit, and the 12V parking lithium battery module (P-LBM) is provided to match the rated capacity of the load, such as the audio device and the navigation device.

According to the exemplary embodiment of the present disclosure, the power is stably supplied to the plurality of loads disposed in the vehicle using the 12V parking lithium battery module (P-LBM). For example, this applies to all ICE vehicle models to which the OTA controller is applied, and the controller of the vehicle utilizes the 12V auxiliary lithium battery system for OTA. When the ISG of the vehicle restarts, the 12V parking lithium battery module provides the power to the audio device, the navigation device, etc. The safety of the vehicle may be enhanced by ensuring the stability of the power supply to the load.

According to the exemplary embodiment of the present disclosure, the auxiliary battery control module provided in the auxiliary battery system of the vehicle is configured to perform the blocking control on the parasitic current of the first load after parking for the predetermined time period, preventing the auxiliary battery from continuously running out of the power, and forcibly cutting off the power supply of the auxiliary battery.

According to the exemplary embodiment of the present disclosure, the auxiliary battery control module may monitor the SOC value of the auxiliary battery and apply the protection function when the auxiliary battery is in the low SOC to stop the operation of the auxiliary battery. In the instant case, by performing the same power flow and charging/discharging logic as in the standby state of the vehicle, the power of the first load including an effect on the safety may be increased, and safety problems due to the lack of the power of the first load may be prevented.

According to the exemplary embodiment of the present disclosure, the auxiliary battery system may communicate with the user terminal, and the auxiliary battery control module may transmit the monitored auxiliary battery state to the user terminal. Accordingly, the user is capable of monitoring the state of the auxiliary lithium battery through the user terminal and selecting whether to charge or discharge the auxiliary lithium battery. Furthermore, when there is no need to use the odometer, the function of the odometer may be turned off according to the user's will.

Various exemplary embodiments of the present disclosure do not list all possible combinations but are intended to illustrate representative aspects of the present disclosure, and the contents described in various exemplary embodiments of the present disclosure may be applied independently or in combination of two or more.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An auxiliary battery system of a vehicle, the auxiliary battery system comprising:
    an auxiliary battery configured to store power used for a plurality of loads of the vehicle, and configured to provide the power to a first load and a second load among the plurality of loads in a state in which the vehicle is parked;
    a switching module electrically connected between the auxiliary battery and the first load; and
    an auxiliary battery control module configured to:
        determine whether a vehicle communication network enters a sleep mode in the state where the vehicle is parked,
        turn on the switching module when the auxiliary battery control module concludes that the vehicle communication network has not entered the sleep mode, and turn off the switching module when a predetermined time period has elapsed after the auxiliary battery control module concludes that the vehicle communication network has entered the sleep mode.

2. The auxiliary battery system of claim 1, wherein the auxiliary battery control module is further configured to control the auxiliary battery in an idle stop and go state of the vehicle to provide the power of the auxiliary battery to the first load among the plurality of loads.

3. The auxiliary battery system of claim 1,
wherein the switching module includes a current sensor,
wherein the current sensor is configured to detect a current flowing into the first load in the state where the vehicle is parked, and
wherein when the detected current flowing into the first load is equal to or greater than a threshold, failure information of the current of the first load is transmitted from the current sensor to the auxiliary battery control module.

4. The auxiliary battery system of claim 2, wherein the auxiliary battery control module is configured to:
monitor a state of charge (SOC) value of the auxiliary battery in a state where the vehicle is in the idle stop and go state,
control the auxiliary battery to provide the power to the first load among the plurality of loads when the SOC value of the auxiliary battery is equal to or greater than a predetermined value, and
stop working of the auxiliary battery when the SOC value of the auxiliary battery is less than the predetermined value.

5. The auxiliary battery system of claim 1, wherein the power is supplied to the first load and the second load by use of a power generated by a generator of the vehicle while the vehicle is in a driving state.

6. The auxiliary battery system of claim 1, wherein the power is supplied to the first load and the second load by use of a power stored in a starting battery of the vehicle while the vehicle is in a standby state.

7. The auxiliary battery system of claim 1,
wherein the power is supplied to the first load and the second load by use of a power generated by a generator of the vehicle while the vehicle is in a driving state, or the power is supplied to the first load and the second load by use of a power stored in a starting battery of the vehicle while the vehicle is in a standby state,
wherein the auxiliary battery system further includes a voltage converter, and
wherein the voltage converter is electrically connected between the generator or the starting battery of the vehicle and the switching module of the auxiliary battery system and is configured to stabilize a voltage of the power input to the first load.

8. The auxiliary battery system of claim 1,
wherein the first load includes at least one of an audio device, a cluster, a navigation device, and an audio amplifier, and
wherein the second load includes at least one of a vehicle odometer, an air conditioner controller, a mood light controller, a cigar jack, a wireless charging device, and a power output device.

9. The auxiliary battery system of claim 1, wherein the auxiliary battery control module is configured to monitor battery state information of the auxiliary battery and send the monitored battery state information to an Audio Video Navigation Telematics, (AVNT) system of the vehicle through the vehicle communication network in real time.

10. The auxiliary battery system of claim 9, wherein the AVNT system is configured to transmit the received battery state information to a user terminal wirelessly.

11. A method of using an auxiliary battery system of a vehicle, the auxiliary battery system of the vehicle including an auxiliary battery, a switching module, and an auxiliary battery control module, and being configured to control supply of a power to a first load and a second load among a plurality of loads, and the switching module being electrically connected between the auxiliary battery and the first load, the method comprising:
storing the power used for the plurality of loads of the vehicle by the auxiliary battery;
providing the power to the first load and the second load among the plurality of loads in a state in which the vehicle is parked;
in the state in which the vehicle is parked, determining, by the auxiliary battery control module, whether a vehicle communication network enters a sleep mode;
turning on the switching module, by the auxiliary battery control module, when the auxiliary battery control module concludes that the vehicle communication network has not entered the sleep mode; and
turning off the switching module, by the auxiliary battery control module, when a predetermined time period elapses after the auxiliary battery control module concludes that the vehicle communication network has entered the sleep mode.

12. The method of claim 11, wherein in an idle stop and go state of the vehicle, the auxiliary battery control module is configured to control the auxiliary battery to provide the power to the first load among the plurality of loads.

13. The method of claim 11,
wherein the switching module includes a current sensor, and
wherein the method further includes:
detecting, by the current sensor, a current flowing into the first load in the state in which the vehicle is parked; and
when the detected current flowing into the first load is equal to or greater than a threshold, transmitting, by the current sensor, failure information of the current of the first load to the auxiliary battery control module.

14. The method of claim 12, further including:
monitoring, by the auxiliary battery control module, a state of charge (SOC) value of the auxiliary battery while the vehicle is in the idle stop and go state;
when the SOC value of the auxiliary battery is equal to or greater than a predetermined value, controlling, by the auxiliary battery control module, the auxiliary battery to provide the power to the first load among the plurality of loads; and
when the SOC value of the auxiliary battery is less than the predetermined value, controlling, by the auxiliary battery control module, the auxiliary battery to stop working.

15. The method of claim 11, wherein the power is supplied to the first load and the second load by use of a power generated by a generator of the vehicle while the vehicle is in a driving state.

16. The method of claim 11, wherein the power is supplied to the first load and the second load by use of a power stored in a starting battery of the vehicle while the vehicle is in a standby state.

17. The method of claim 11,
wherein the power is supplied to the first load and the second load by use of a power generated by a generator of the vehicle while the vehicle is in a driving state, or the power is supplied to the first load and the second load by use of a power stored in a starting battery of the vehicle while the vehicle is in a standby state, wherein the auxiliary battery system of the vehicle further includes a voltage converter; and wherein the voltage converter is electrically connected between the generator or the starting battery of the vehicle and the switching module of the auxiliary battery system and is configured to stabilize a voltage of the power input to the first load.

18. The method of claim 11, wherein the first load includes at least one of an audio device, a cluster, a navigation device, and an audio amplifier, and wherein the second load includes at least one of a vehicle odometer, an air conditioner controller, a mood light controller, a cigar jack, a wireless charging device, and a power output device.

19. The method of claim 11, wherein the auxiliary battery control module is configured to monitor battery state information of the auxiliary battery and to send the monitored battery state information to an Audio Video Navigation Telematics (AVNT) system of the vehicle through the vehicle communication network in real time.

20. The method of claim 19, wherein the AVNT system is configured to transmit the received battery state information to a user terminal wirelessly.

\*    \*    \*    \*    \*